Patented Aug. 4, 1936

2,049,433

UNITED STATES PATENT OFFICE 2,049,433

COLORING OF MATERIALS MADE WITH OR CONTAINING CELLULOSE DERIVATIVES

George Holland Ellis, Henry Charles Olpin, and Ernest William Kirk, Spondon, near Derby, England, assignors to Celanese Corporation of America, a corporation of Delaware No Drawing. Application June 22, 1928, Serial No. 287,644. In Great Britain July 19, 1927

8 Claims. (Cl. 8—5)

This invention relates to the dyeing, printing, stencilling, or otherwise coloring of threads, yarns, knitted or woven fabrics, or other products made with or containing cellulose acetate or other organic acid esters of cellulose, such for example as cellulose formate, propionate, or butyrate, or the products obtained by the treatment of alkalized cellulose with esterifying agents (e. g. the product known as "immunized cotton" obtained by treatment with p-toluene sulpho-chloride), or made of or containing cellulose ethers, such for example as methyl, ethyl or benzyl cellulose, or the corresponding condensation products of cellulose and glycols or other polyhydric alcohols, all of which cellulose derivatives are hereinafter referred to as organic substitution derivatives of cellulose.

According to the present invention materials made of or containing cellulose acetate or other of the aforesaid organic substitution derivatives of cellulose are dyed or otherwise colored with azo coloring matters in the production of which a naphthylene diamine is employed as a component. The term component is used to include the coupling component and the component which is diazotized and coupled therewith. The diamines employed may or may not be substituted in the nucleus.

The coloring matters for use according to the present invention may be of any desired series. Thus for example monoazo dystuffs may be obtained by coupling a suitable diazo body of the benzene or naphthalene series with a naphthylene diamine or by diazotizing a naphthylene diamine for example a monoacidyl naphthylene diamine and coupling with an end component for example of the benzene or naphthalene series or with the same or a different naphthylene diamine and such dyestuffs may if desired be subsequently diazotized on the fibre and developed with a suitable developer.

Disazo dyestuffs may be obtained by tetrazotizing a suitable diamine, for example benzidine, tolidine, dianisidine, diamino stilbene, diamino diphenyl methane and the like, and coupling with two molecules of a nahpthylene diamine or with one molecule of a naphthylene diamine and a further molecule of another napthylene diamina or of another suitable end component for example of the benzene or napthylene series. Secondary disazo dyestuffs may be obtained for example by diazotizing a suitable aminoazo compound such for example as benzene-azo-α-naphthylamine or aminoazobenzene or their nuclear substitution derivatives or by diazotizing one amino group of a diaminoazo compound e. g. p.p'-diaminoazobenzene or 4-aminobenzene-1-azo-4 aminonaphthalene and coupling the resulting diazo compound with a naphthylene diamine or by diazotizing a suitable amine, coupling with a mono acidyl naphthylene diamine and diazotizing the resulting compound and coupling with the same or different napthylene diamine or other suitable coupling component. The disazo dyestuffs when containing diazotizable amino groups may be diazotized on the material and developed.

The above examples of the methods of forming the dyestuffs and of the different series of dyestuffs which may be used according to the present invention are intended to be illustrative and not to limit the invention.

Where nitroamines, such as p-nitraniline, or monoacidyl diamines such as p-amino acetanilide or p-amino phenyl oxamic acid have been used in the preparation of the dyestuffs, the nitro or acidyl amino groups may be reduced or hydrolyzed as the case may be, the resulting compounds being particularly useful for diazotization and development on the fibre.

Many of the dyestuffs and particularly those containing only one azo grouping attached to the naphthalene nucleus of the napthylene diamine may be developed on the fibre with a suitable diazo body.

The dyestuffs, if soluble or fairly soluble in neutral, slightly alkaline or slightly acid solution, may be applied directly from such an aqueous medium with or without the addition of a dispersing agent, or if insoluble or only slightly soluble in water they may be applied from dispersions in water obtained by any of the methods known in the colloid arts, for example by pretreatment of the dyestuffs with solubilizing agents as described in prior U. S. Patents Nos. 1,618,413, 1,618,414, 1,690,481, 1,694,413 and 1,716,721 and U. S. applications 152,517 and 134,138 filed on December 3, 1926 and September 7, 1926 respectively.

The following are examples of the dyestuffs which may be applied according to the present invention:— p-nitraniline→1.5-naphthylene diamine _____ Orange-red
5-nitro-2-aminoanisole→monoacetyl-1.5-naphthylene diamine _____ Red The process of the invention may be applied to the dyeing or otherwise coloring of mixed goods comprising for example, in addition to cellulose acetate or other organic substitution derivative of cellulose, silk, wool or cotton or other cellulosic fibres, natural or artificial, in solid or differential shades according to the affinity of the dyestuffs for the fibres used in association.

The following examples illustrate the invention, it being understood that they are not intended to limit it.

*Example 1.*—To dye 10 kilos of cellulose acetate fabric an orange-red shade:—

100 grams of the dyestuff para nitro benzene azo-1:5-naphthylenediamine are reduced to a fine powder and stirred into 600 grams of 50% sodium sulphoricinoleate. The resulting mixture is heated to 90° C. and stirred till homogeneous. It is now diluted with 5 litres of boiling soft water, stirred well, and passed through a filter cloth into a dyebath containing 300 litres soft water, in which have been dissolved 50 grams Marseilles soap. The fabric is entered, and dyeing carried out by raising the temperature to 75–80° C. during ¾ hr. and maintaining at this temperature till exhausted. The fabric which is now dyed a deep orange-red shade, is rinsed and dried or otherwise treated as desired.

*Example 2.*—To dye 10 kilos of cellulose acetate fabric a red shade:—

100 grams of the dyestuff 5-nitro-2-aminoanisole→monoacetyl-1:5-naphthylenediamine are ground to a fine powder, and stirred into 600 grams of the dispersing agent prepared according to Example A of our previous U. S. Patent No. 1,694,413. The dyebath is made up, and dyeing carried through precisely as in Example 1 above. The fabric which is now dyed a red shade is rinsed, and dried or otherwise treated as desired.

Instead of the cellulose acetate materials treated in the above examples, materials made of or containing other organic substitution derivatives of cellulose, for example cellulose formate, cellulose propionate, methyl cellulose, ethyl cellulose, "immunized cotton" etc., may be similarly colored. Instead of dyestuffs derived from 1.5-naphthylene diamine, dyestuffs derived from its nuclear substitution products or from other naphthylene diamines or their nuclear substitution products may be used.

The term dyeing in the appended claims is to be understood to include printing, stencilling or otherwise coloring.

What we claim and desire to secure by Letters Patent is:—

1. Process for dyeing materials comprising organic substitution derivatives of cellulose characterized in that said materials are colored by means of an azo dye in the production of which a naphthylene diamine is employed as a component and which contains at the most two azo groups.

2. Process for dyeing materials comprising organic substitution derivatives of cellulose characterized in that said materials are colored by means of an unsulphonated azo dye in the production of which a naphthylene diamine is employed as a component and which contains at the most two azo groups.

3. Process for dyeing materials comprising organic substitution derivatives of cellulose characterized in that said materials are colored by means of an unsulphonated azo dye in the production of which a 1.5 naphthylene diamine is employed as a component and which contains at the most two azo groups.

4. Process for dyeing materials comprising cellulose acetate characterized in that said materials are colored by means of an azo dye in the production of which a naphthylene diamine is employed as a component and which contains at the most two azo groups.

5. Process for dyeing materials comprising cellulose acetate characterized in that said materials are colored by means of an unsulphonated azo dye in the production of which a naphthylene diamine is employed as a component and which at the most contains two azo groups.

6. Process for dyeing materials comprising cellulose acetate characterized in that said materials are colored by means of an unsulphonated azo dye in the production of which a 1.5 naphthylene diamine is employed as a component and which at the most contains two azo groups.

7. Process for dyeing materials comprising organic substitution derivatives of cellulose characterized in that said materials are colored by means of an unsulphonated aminoazo dye in the production of which a naphthylene diamine is employed as a component and which contains at the most two azo groups, said dye being diazotized and developed on the material.

8. Process for dyeing materials comprising cellulose acetate characterized in that said materials are colored by means of an unsulphonated aminoazo dye in the production of which a 1.5 naphthylene diamine is employed as a component and which contains at the most two azo groups, said dye being diazotized and developed on the material.

GEORGE HOLLAND ELLIS.
HENRY CHARLES OLPIN.
ERNEST WILLIAM KIRK.